US009654832B1

(12) United States Patent
Arunachalam (10) Patent No.: US 9,654,832 B1
(45) Date of Patent: May 16, 2017

(54) NOTIFICATION OF AN UPCOMING LIVE MEDIA PROGRAM

(71) Applicant: Telefonaktiebolaget L M Ericsson (publ), Stockholm (SE)

(72) Inventor: Vasanth Arunachalam, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/930,611

(22) Filed: Nov. 2, 2015

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 21/472* | (2011.01) | |
| *H04N 21/2187* | (2011.01) | |
| *H04N 21/4147* | (2011.01) | |
| *H04N 21/475* | (2011.01) | |
| *H04N 21/45* | (2011.01) | |
| *H04N 21/488* | (2011.01) | |

(52) U.S. Cl.
CPC ... *H04N 21/47214* (2013.01); *H04N 21/2187* (2013.01); *H04N 21/4147* (2013.01); *H04N 21/45* (2013.01); *H04N 21/4755* (2013.01); *H04N 21/4882* (2013.01)

(58) Field of Classification Search
CPC ......... H04N 21/47214; H04N 21/2187; H04N 21/4147; H04N 21/45; H04N 21/4755; H04N 21/4882
USPC ...................................... 725/37–40
See application file for complete search history.

(56) References Cited

U.S. PATENT DOCUMENTS

| | | | |
|---|---|---|---|
| 2006/0136966 A1 | 6/2006 | Folk | |
| 2013/0170819 A1* | 7/2013 | Dykeman | H04N 21/41407 386/299 |
| 2014/0181861 A1* | 6/2014 | Reneris | H04N 21/4882 725/34 |
| 2014/0207957 A1* | 7/2014 | Zhang | H04L 67/02 709/227 |
| 2015/0150045 A1* | 5/2015 | Shovkoplias | H04N 21/44222 725/34 |

(Continued)

OTHER PUBLICATIONS

How to find great new shows with TiVo Suggestions, 2015 TiVo inc., downloaded at: https://www.tivo.com/support/how-to/get-suggestions, on Nov. 2, 2015, 2 pages.

*Primary Examiner* — Kyu Chae
(74) *Attorney, Agent, or Firm* — Nicholson De Vos Webster & Elliott LLP (57) ABSTRACT

Providing a notification of an upcoming live media program to a user including determining that the upcoming live media program is scheduled to start within a predefined amount of time that serves as an indication that the upcoming live media program is about to start, where the upcoming live media program has been automatically determined to be of interest to the user. A client device of the user is determined to be not connected to a service providing playback of the upcoming live media program and the program is not currently scheduled to be recorded for the user. Responsive to determining that the upcoming live media program is not currently scheduled to be recorded for the user, a notification is transmitted to the user that indicates that the upcoming live media program is about to start.

18 Claims, 5 Drawing Sheets

(56) References Cited

U.S. PATENT DOCUMENTS

2015/0169648 A1    6/2015  Foebel et al.
2016/0073172 A1*  3/2016  Sharples ............ H04N 21/4126
                                                   725/53

* cited by examiner

NOTIFICATION OF AN UPCOMING LIVE MEDIA PROGRAM

FIELD

Embodiments of the invention relate to the field of media processing, and more specifically to a notification of an upcoming live media program.

BACKGROUND

Users have few options for receiving reminders and/or scheduling recordings of live media programs such as live TV shows. Most or live program notifications are reminder based. Users typically set a reminder for a specific TV schedule or program and the TV or over-the-top (OTT) application on their set-top box (STB) or mobile device notifies them before the scheduled start time (e.g., 10 to 15 minutes before the scheduled start time). When live program notifications are reminder based, the reminder will be sent regardless of whether the user is watching the live program. If the user is watching the live program, the reminder notification may be seen as an annoyance for the user. Also, users forget to set reminders.

The user has the option of scheduling a recording in the event that the user is not able to watch the show when it airs. Typically the recording must be scheduled in advance. However, it is common for a user to forget to schedule a recording in advance. Some services allow for shows to be automatically recorded for a user based on that user voting (e.g., Thumbs-up or Thumbs-down) against content. Thus, these services require users to actively provide data on a regular basis to let the system know what they like and do not like. These services are neither dynamic nor analytics-driven based on the user's live program watching patterns.

SUMMARY

In an embodiment, a notification of an upcoming live media program is transmitted to a user. The upcoming live media program is determined to be scheduled to start within a predefined amount of time that serves as an indication that the upcoming live media program is about to start, where the upcoming live media program has been automatically determined to be of interest to the user. Responsive to determining that the upcoming live media program is scheduled to start within the predefined amount of time, a determination is made that a client device of the user is not connected to a service providing playback of the upcoming live media program. Responsive to the determination that the client device of the user is not connected to the service providing playback of the upcoming live media program, a determination is made that the upcoming live media program is not currently scheduled to be recorded for the user. Responsive to the determination that the upcoming live media program is not currently scheduled to be recorded for the user, a notification is caused to be transmitted to the user, where the notification indicates that the upcoming live media program is about to start.

Providing a notification of an upcoming live media program to a user including determining that the upcoming live media program is scheduled to start within a predefined amount of time that serves as an indication that the upcoming live media program is about to start, where the upcoming live media program has been automatically determined to be of interest to the user. A client device of the user is determined to be not connected to a service providing playback of the upcoming live media program and the program is not currently scheduled to be recorded for the user. Responsive to determining that the upcoming live media program is not currently scheduled to be recorded for the user, a notification is transmitted to the user that indicates that the upcoming live media program is about to start.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for automatically notifying a user of an upcoming live media program based on the history of media consumption of the user is described in an embodiment. A user of a service that provides playback of live media programs watches content provided by the service (whatever the user wants to watch). This media consumption data is logged by an analytics component of the media service and used to determine the media watching preferences of the user, such as the user's favorite or most watched shows or events. As an example, if the user watches the same TV program of a TV series every week, the analytics portion of the service may determine that the TV program is one of the user's favorite shows to watch and is of interest to the user. When a program of interest is about to start (e.g., the program is scheduled to start within a predefined time period, which may be less than or equal to 1 minute before the scheduled start time), the media service determines whether a client device of the user that is capable of playing the program is connected to the service. In an embodiment, the media service checks whether a persistent connection, such as a Websocket connection, is established between the media service and a client device of the user. If such a client device is not connected to the media service, the media service checks whether a recording of the program has been scheduled for the user. If a recording of the program is also not scheduled, the media service causes a notification to be sent to the user that indicates that the program of interest is about to start. The notification may include an option for the user to record the program and/or to tune to the channel that will play the program. The media service may automatically schedule and start a recording of the program of interest.

Figure 1:
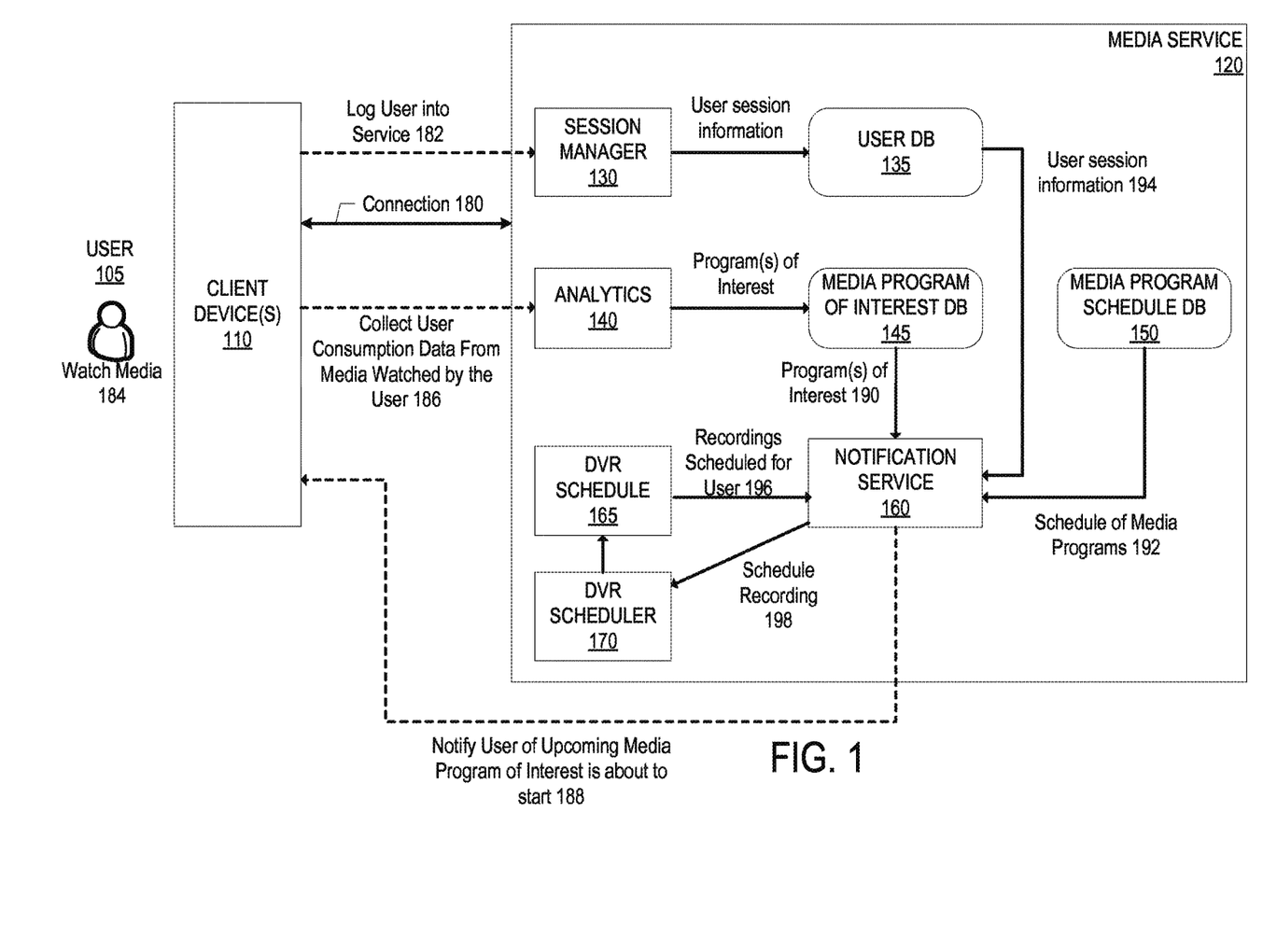
FIG. 1 illustrates an exemplary system for notifying a user of an upcoming live media program based on the history of media consumption of the user according to one embodiment.

FIG. 1 illustrates an exemplary system for notifying a user of an upcoming live media program based on the history of media consumption of the user according to one embodiment. The system includes the media service 120 that provides service for the user 105 to view live media content. Although not shown in FIG. 1, a network for live media may include a live media backend that transmits live video to the client device(s) 110. The live media may or may not go through the media service 120. The client device(s) 110 connect to the media service 120. Some of the client device(s) 110 are a client computing device capable of receiving and playing live media programs such as a set-top box, a mobile device (e.g., smartphone, tablet, wearable device) with an application for playing live media, a laptop or desktop computer with an application for playing live media and/or a browser to play live media. Other client device(s) 110 may be a client computing device that is capable of receiving notifications of an upcoming live media program but are not capable of playing the live media program itself. For example, a smartwatch may be capable of receiving a notification of an upcoming live media program but may not be able to play the live media program itself.

The user 105 logs into 182 the media service 120. A client device may automatically login to the media service 120 upon being powered and as part of its booting process (e.g., in situations where the client device is a set-top box). Alternatively, the user may be required to enter in login credentials on a client device to login to the media service 120 (e.g., in situations where the client device is a mobile device or a laptop/desktop computer). In an embodiment, logging into the service includes establishing a persistent connection 180 between a client device and the media service 120. In an embodiment, the persistent connection 180 is a Websocket connection that is connected to the media service 120 upon logging into the media service 120. The Websocket connection is torn down when the user logs out of the media service 120.

The media service 120 includes the session manager 130 that manages sessions of users connected to the media service 120. For instance, when the user 105 logs into 182 the media service 120, the session manager 130 assigns a session identifier and stores that session identifier for the user 105 in the user database 135, which indicates that the user 105 is logged into the media service 120. The session identifier is cleared when the user 105 is logged out of the media service 120, which occurs if the user 105 chooses to log out of the media service 120 and may occur if the media service 120 times out the user 105 due to inactivity, for example.

After logging into the media service 120, the user 105 may use one or more of the client devices 110 to watch live media content. Other types of content may also be watched such as video on demand (VOD) content, recorded content, and/or over-the-top (OTT) content. Typically the user 105 will watch whatever the user 105 wants to watch. The media service 120 includes the analytics component 140 that is operable to collect 186 user consumption data from media watched by the user 105. The user consumption data may include data such as the watched media content asset identifier, playback start time, playback stop time, playback pause, playback stop, favorites made by the user, and any other action performed by the user via the media service 120; and may also include information about the watched media such as genre, actors, director, writers, studio, etc.

The analytics component 140 of the media service 120 analyzes the user consumption data and determines, from the user consumption data, program(s) of interest of the user. The list of the determined program(s) of interest are stored in the media program of interest database 145. A program of interest may be a program of a series in which the user regularly watches. As an example, if the user consumption data indicates that the user 105 watches the same TV program of a TV series every week, the analytics component 140 may determine that the TV program is of interest to the user. A program of interest may be a program of a genre in which the user regularly watches. For example, if the user consumption data indicates that the user 105 regularly watches cooking competition shows, the analytics component 140 may determine that a cooking competition show (which the user may or may not watch) is of interest to the user. As another example, if the user consumption data indicates that the user 105 regularly watches a sporting event, the analytics component 140 may determine that the sporting event is of interest to the user. A program of interest may be a program with an actor, director, and/or writer in which the user regularly watches. For example, if the user consumption data indicates that the user 105 watches TV programs and/or movies with a particular actor with some frequency, the analytics component 140 may determine that an upcoming program with that actor is a program of interest for the user 105.

Figure 2:
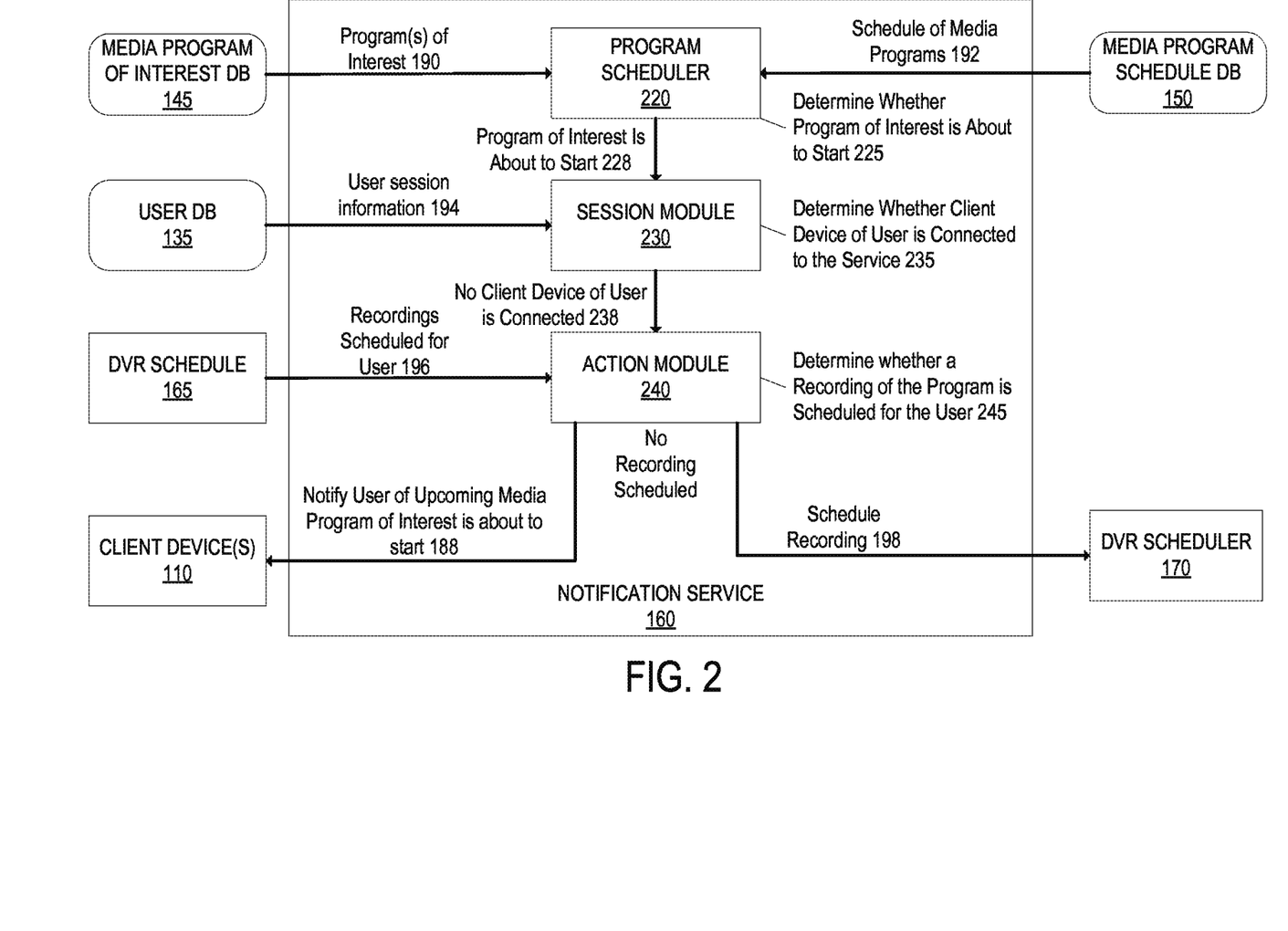
FIG. 2 illustrates more detail of the notification service of FIG. 1 according to an embodiment.

The media service 120 includes the notification service 160 that is operable to manage notifying the user 105 of an upcoming live media program that has been determined to be of interest to the user 105 based on the user consumption data of the user 105. FIG. 2 illustrates more detail of the notification service 160 according to an embodiment. The notification service 160 takes as input the user session information 194 (which indicates whether the user 105 is logged into the service and may also indicate what channel, if any, the user is currently tuned to, and may indicate the type of client device that is logged in to the service), the list of program(s) of interest 190, and the schedule of media programs 192 provided by the media program schedule database 150 that provides the schedule of when media programs are to start. When an upcoming live media program of interest is scheduled to start within a predefined amount of time that serves as an indication that the upcoming live media program of interest is about to start (e.g., the predefined amount of time is typically less than or equal to 1 minute), the notification service 160 determines, from the user session information 194, whether a client device 110 of the user 105 is connected to the media service 120. For example, with reference to FIG. 2, the program scheduler 220 of the notification service 220 determines whether a program of interest is about to start 225 based on the list of program(s) of interest 190 and the schedule of media programs 192. The program of interest that is about to start 228 is provided by the program scheduler 220 to the session module 230, which determines whether a client device 110 of the user 105 is connected 235 to the media service 120 based on the user session information 194.

If the client device 110 of the user 105 is connected to the media service 120, the notification service 160 may further determine if the client device 110 of the user 105 is currently tuned to the channel that will be playing the upcoming live media program of interest. If a client device 110 of the user 105 is not connected to the media service 120 when the upcoming live media program is scheduled to start with in the predefined amount of time, the notification service 160 determines whether a recording of the upcoming live media program is scheduled for the user 105. For instance, the notification service 160 accesses the DVR schedule 165 to determine the recordings scheduled 196 for the user 105. With reference to FIG. 2, the session module 230 provides to the action module 240 that there is not a client device 110 of the user 105 connected 238 to the media service 120. The action module 240 determines whether a recording of the upcoming program of interest is scheduled 245 for the user 105 based on the recordings scheduled 196 for the user 105. If a recording is scheduled for the upcoming live media program for the user 105, the notification service 160 does not notify the user of the upcoming live media program. However, if a recording is not scheduled for the upcoming live media program for the user 105, the action module 240 of the notification service 160 causes a notification to be transmitted to a client device 110 of the user 105 that notifies the user that the upcoming live media program is about to start 188. In an embodiment, the action module 240 of the notification service 160 may automatically schedule a recording 198 by sending a command to the DVR scheduler 170 to the schedule a recording for the upcoming live media program. The DVR functionality and recordings may be local to a client device of the user 105 (e.g., incorporated in a set-top box of the user 105) or may be centrally controlled and stored (e.g., in a network DVR in which a client device of the user 105 has access).

Figure 3:
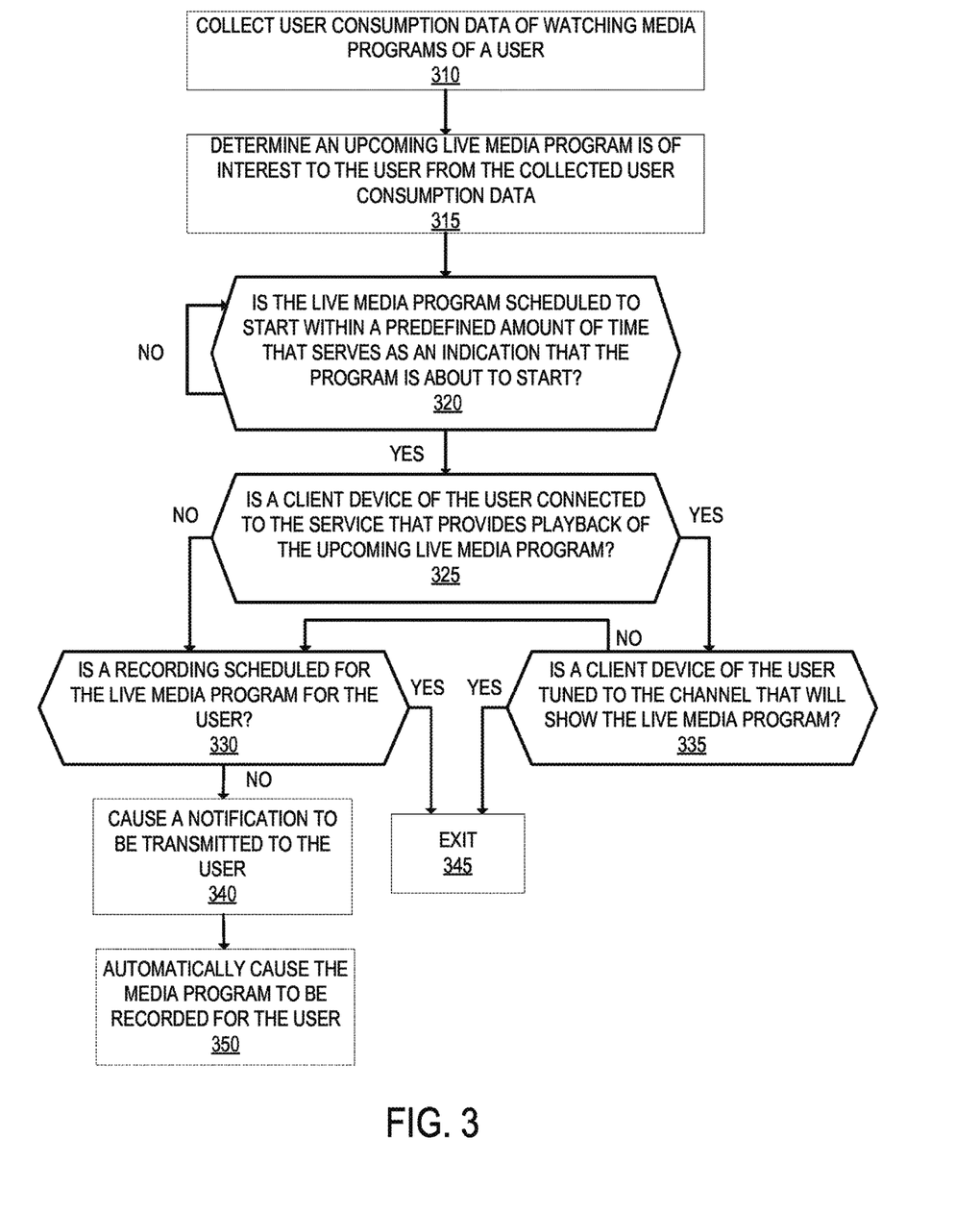
FIG. 3 is a flow diagram that illustrates exemplary operations for notifying a user of an upcoming live media program according to an embodiment.

FIG. 3 is a flow diagram that illustrates exemplary operations for notifying a user of an upcoming live media program according to an embodiment. The operations of FIGS. 3 and 4 will be described with respect to the exemplary embodiment of FIGS. 1 and 2. However, it should be understood that the exemplary embodiments of FIGS. 1 and 2 can perform operations different than that described with respect to FIGS. 3 and 4; and the operations described with respect to FIGS. 3 and 4 can be performed by different embodiments than those described with respect to FIGS. 1 and 2.

At operation 310, the analytics component 140 of the media service 120 collects user consumption data of watching media programs of a user. The user consumption data may include data such as the watched media content asset identifier, playback start time, playback stop time, playback pause, playback stop, favorites made by the user, and any other action performed by the user via the media service 120; and may also include information about the watched media such as genre, actors, director, writers, studio, etc. Prior to collecting the user consumption data, the user has logged into the service (e.g., a client device such as a set-top box was powered and turned on, an application for the service was launched on a client device, etc.). Flow moves from operation 310 to operation 315.

The analytics component 140 uses the collected user consumption data to automatically determine programs of interest to the user. At operation 315, the analytics component 140 of the media service 120 determines that an upcoming live media program is of interest to the user from the collected user consumption data. The list of the determined program(s) of interest are stored in the media program of interest database 145. A program of interest may be a program of a series in which the user regularly watches. As an example, if the user consumption data indicates that the user 105 watches the same TV program of a TV series every week, the analytics component 140 may determine that the TV program is of interest to the user. A program of interest may be a program of a genre in which the user regularly watches. For example, if the user consumption data indicates that the user 105 regularly watches cooking competition shows, the analytics component 140 may determine that a cooking competition show (which the user may or may not watch) is of interest to the user. As another example, if the user consumption data indicates that the user 105 regularly watches a sporting event, the analytics component 140 may determine that the sporting event is of interest to the user. A program of interest may be a program with an actor, director, and/or writer in which the user regularly watches. For example, if the user consumption data indicates that the user 105 watches TV programs and/or movies with a particular actor with some frequency, the analytics component 140 may determine that an upcoming program with that actor is a program of interest for the user 105. It should be understood that the operation of 315 may be performed while the user is logged into the media service 120 or while the user is logged out of the media service 120. Flow moves from operation 315 to operation 320.

At operation 320, the notification service 160 determines whether the upcoming live media program is scheduled to start within a predefined amount of time that serves as an indication that the program is about to start. In an embodiment, the predefined amount of time is less than or equal to 1 minute. The notification service 160 uses the determined program(s) of interest 190 and the schedule of media programs 192 when determining that the upcoming live media program is scheduled to start within a predefined amount of time that serves as an indication that the program is about to start. It should be understood that this operation is performed regardless of whether the user is logged in or out of the media service 120. If the upcoming live media program is scheduled to start within the predefined amount of time that serves as an indication that the program is about to start, flow moves to operation 325; otherwise flow continues to remain at operation 320 until an upcoming live media program is about to start.

At operation 325, the notification service 160 determines whether a client device of the user is connected to the media service 120 that provides playback of the upcoming live media program. In an embodiment, connecting to the media service 120 occurs as a result of the user 105 logging into the media service 120 and a session identifier is assigned for the user that indicates an active connection to the media service 120. Connecting to the media service 120 may include the establishment of a persistent connection between a client device of the user and the media service 120, such as a Websocket connection. In such an embodiment, the notification service 160 accesses the user session information 194 to determine whether a session identifier exists for the user 105 that indicates whether a client device of the user is connected to the media service 120. A client device that is connected to the media service 120 may be an indication that the user 105 is currently watching a media program. If a client device of the user 105 is connected to the media service, then flow moves to operation 335; otherwise flow moves to operation 330.

At operation 330 (a client device of the user 105 capable of playback of the upcoming live media program is not connected to the media service 120), the notification service 160 determines whether a recording is scheduled for the live media program for the user. For instance, the notification service 160 accesses the DVR schedule 165 to determine the recordings scheduled 196 for the user 105. If a recording is scheduled for the upcoming live media program for the user, then flow moves to operation 345 where the operations end. Thus, if a recording is scheduled for the upcoming live media program, then in an embodiment the notification service 160 does not notify the user of the upcoming live media program. If a recording is not scheduled for the upcoming live media program for the user, then flow moves to operation 340 where the notification service 160 causes a notification to be transmitted to the user, where the notification indicates that the upcoming live media program is about to start.

The notification may be sent to one or more contact points of the user 105 (which may be pre-established or configured by the user or service). For instance, the notification may be sent via: a text message (SMS or MMS message) to a contact point (e.g., phone number or email address) of the user 105; an email to an email address of the user 105; and/or an application that connects to the media service 120 such as an application on a mobile device (e.g., smartphone, tablet, wearable device).

The content of the notification may be different in different embodiments and may be different depending on the client device receiving the notification. For example, in one embodiment, the notification displays to the user that the show is about to start. In another embodiment, the notification includes an option for the user 105 to initiate a recording of the upcoming live media program which, when selected, causes the upcoming live media program to be recorded for the user 105 (e.g., a command may be sent to the DVR scheduler 170 to schedule a recording for the upcoming live media program). In another embodiment, the notification includes an option for the user 105 to cast the upcoming live media program to a set-top box or other client device of the user 105, which when selected, causes the upcoming live media program to be played on the set-top box or other client device of the user 105 (in a specific embodiment, which is described in more detail with respect to FIG. 4, this option may be presented only if it is determined that the client device receiving the notification is in proximity to a client device capable of playing back the media program).

Flow moves from operation 340 to operation 350, which is optional in an embodiment, where the notification service 160 automatically causes the media program to be recorded for the user 105. For example, the notification service 160 may automatically schedule a recording 198 by sending a command to the DVR scheduler 170 to the schedule a recording for the upcoming live media program for the user 105. In such an embodiment, the notification to the user may indicate that a recording is being scheduled for the user.

At operation 335, which is optional in an embodiment, the notification service 160 determines whether the connected client device of the user is tuned to the channel that will show the upcoming live media program. The user session information 194 may indicate what channel the user is currently tuned to. If the user is not tuned to the channel that will show the upcoming live media program, then flow moves to operation 330. If the user is tuned to the channel that will show the upcoming live media program, then flow moves to operation 345 where operations end.

The order of operations of FIG. 3 are exemplary and can be performed in a different order in an embodiment. For instance, the notification service 160 may determine whether a recording is scheduled for a program of interest prior to determining whether a client device of the user is connected to the media service 120 after it is determined that the program of interest is scheduled to start within the predefined amount of time that serves as an indication that the program is about to start. In such an embodiment, if a recording of the program of interest is scheduled, the notification service 160 will not notify the user that the upcoming program of interest is about to start; and if a recording of the program of interest is not scheduled, the notification service 160 then determines whether a client device of the user is connected to the media service 120. As another example, the notification service 160 may automatically cause the media program to be recorded in operation 350 before, or without, causing a notification to be transmitted to the user in operation 340.

The users of the service can benefit from timely real-time notifications from the media service 120 if it appears that they may miss their favorite show, event, or other program of interest, without requiring the user to proactively set reminders or schedule DVR recordings.

Figure 4:
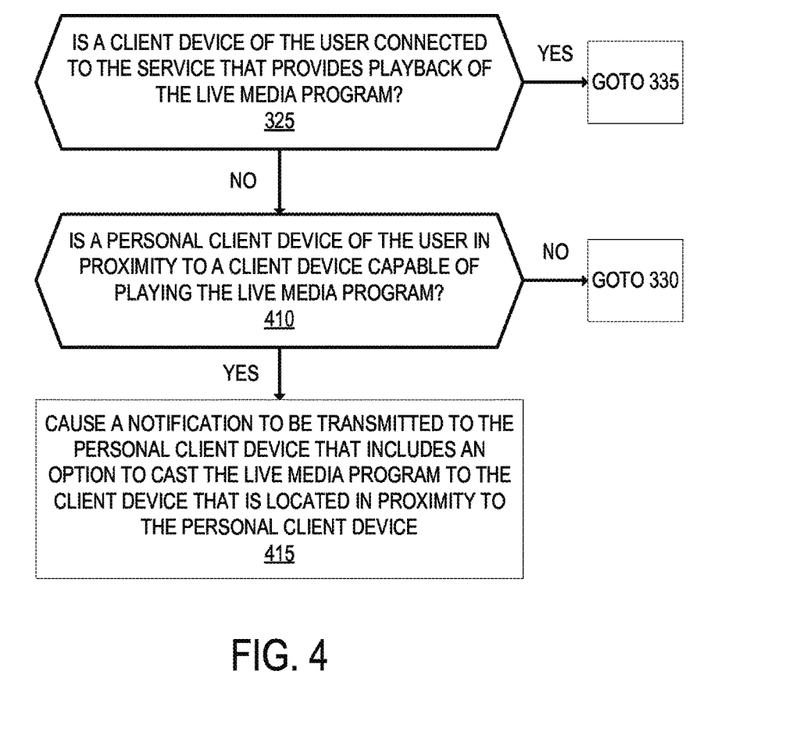
FIG. 4 is a flow diagram that illustrates exemplary operations for notifying a user of an upcoming live media program according to an embodiment.

FIG. 4 is a flow diagram that illustrates exemplary operations for notifying a user of an upcoming live media program according to an embodiment. The operations of FIG. 4 starts with the operation 325 described with respect to FIG. 3. However, in the embodiment described in FIG. 4, if the notification service 160 determines that a client device of the user 105 is not connected to the media service 120, the flow moves from operation 325 to operation 410. At operation 410, the notification service 160 determines whether a personal client device of the user is in proximity to a client device capable of playing the upcoming live media program such as a set-top box. In such a case, the user 105 may be near their television set (for example), but simply has forgotten that a show they are interested in is about to start. A personal client device may be a client device of the user 105 in which the user 105 typically carries with them such as a smartphone or wearable device; and such a device may not have the ability to play the upcoming live media program. The notification service 160 may determine whether a personal client device of the user 105 is in proximity to the client device capable of playing the upcoming live media program through the use of a wireless connection between the two devices. For instance, the devices may connect (when in range) via a Bluetooth (such as a Bluetooth Low Energy (BTLE)) connection. The notification service 160 may query the personal client device(s) of the user 105 to determine whether they are wirelessly connected with the other client device. In an alternative embodiment, the notification service 160 may query the personal client device(s) of the user 105 for their location (e.g., through Global Positioning System (GPS), Wi-Fi based positioning system) and compare the reported location against the address of the user 105 to determine whether the personal client device is in proximity to a client device that is capable of playing the upcoming live media program. If a personal client device of the user 105 is not in proximity to another client device that is capable of playing the upcoming live media program, then flow moves to operation 330 of FIG. 3; however, if a personal client device of the user 105 has been determined to be in proximity to another client device of the user 105 that is capable of playing the upcoming live media program, then flow moves to operation 415. A At operation 415, the notification service 160 causes a notification to be transmitted to the personal client device in proximity with the other client device, where the notification includes an option for the user 105 to cast the upcoming live media program to the client device that is capable of playing the upcoming live media program. Upon selection of the user to cast the upcoming live media program, a message is sent to the media service 120 to begin playing the upcoming live media program on the other client device of the user 105 and the media service 120 in turn causes that client device to play that upcoming live media program.

Figure 5:
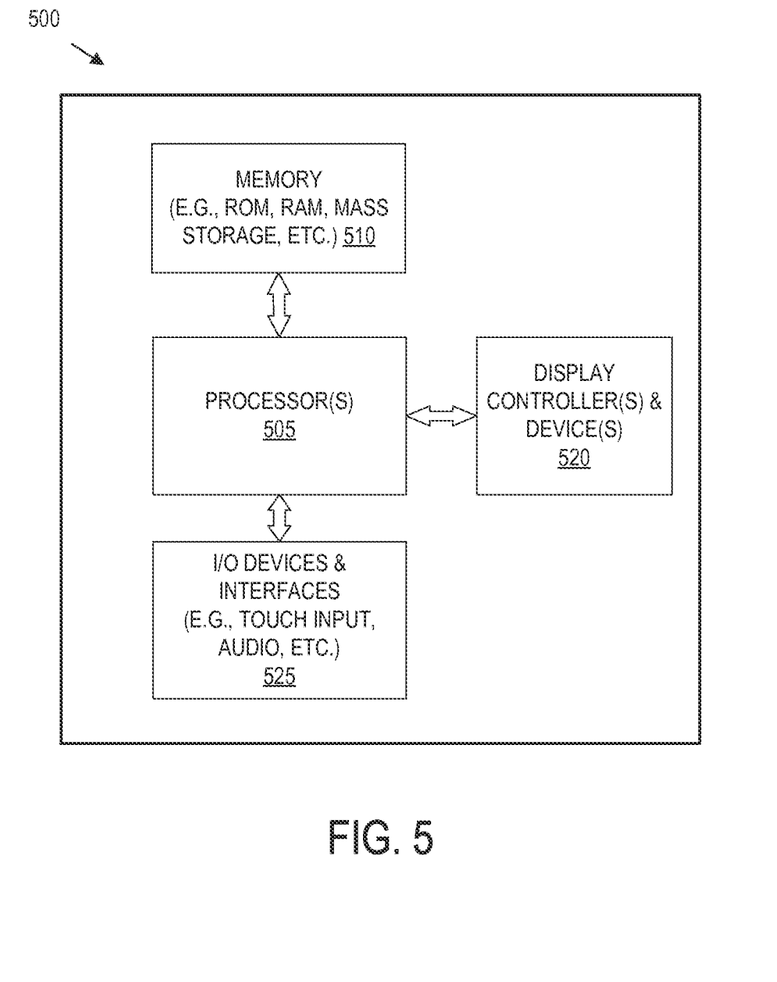
FIG. 5 illustrates a block diagram for an exemplary data processing system 500 that may be used in some embodiments.

FIG. 5 illustrates a block diagram for an exemplary data processing system 500 that may be used in some embodiments. Data processing system 500 includes one or more microprocessors 505 and connected system components (e.g., multiple connected chips). Alternatively, the data processing system 500 is a system on a chip. One or more such data processing systems 500 may be utilized to implement the functionality of a client device 110 and/or a server of the media service 120. The data processing system 500 includes memory 510, which is coupled to the microprocessor(s) 505. The memory 510 may be used for storing data, metadata, and programs for execution by the microprocessor(s) 505; that, when executed by the microprocessor(s) 505, causes the data processing system 500 to perform the operations described herein. The memory 510 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 510 may be internal or distributed memory. A display controller and display device 520 provides a visual user interface for the user, e.g., GUI elements or windows.

The data processing system 500 also includes one or more input or output ("I/O") devices and interfaces 525, which are provided to allow a user to provide input to, receive output from, and otherwise transfer data to and from the system. These I/O devices 525 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 500.

The I/O devices and interfaces 525 may also include a connector for a dock or a connector for a USB interface, FireWire, Thunderbolt, Ethernet, etc., to connect the system 500 with another device, external component, or a network. Exemplary I/O devices and interfaces 525 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 500 with another device, external component, or a network and receive stored instructions, data, tokens, etc. It will be appreciated that one or more buses may be used to interconnect the various components shown in FIG. 5.

It will be appreciated that additional components, not shown, may also be part of the system 500, and, in certain embodiments, fewer components than that shown in FIG. 5 may also be used in a data processing system 500. For example, in some embodiments where the data processing system 500 is a set top box, the set top box may include components such as a digital broadcast receiver (e.g., satellite dish receiver, radio frequency (RF) receiver, microwave receiver, multicast listener, etc.) and/or a tuner that tunes to appropriate frequencies or addresses of received content. For example, a tuner may be configured to receive digital broadcast data in a particularized format, such as MPEG-encoded digital video and audio data, as well as digital data in many different forms, including software programs and programming information in the form of data files. As another example, the set top box may include a key listener unit to receive authorization and/or session keys transmitted from a server. The keys received by listener unit may be used by cryptographic security services implemented in a protection mechanism in the set top box to enable decryption of the session keys and data.

The techniques shown in the figures can be implemented using code and data stored and executed on one or more electronic devices (e.g., an event device, a hub device, an action device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for providing a notification of an upcoming live media program to a user, comprising:
    determining that the upcoming live media program is scheduled to start within a predefined amount of time that serves as an indication that the upcoming live media program is about to start, wherein the upcoming live media program has been automatically determined to be of interest to the user;
    responsive to determining that the upcoming live media program is scheduled to start within the predefined amount of time, determining that a client device of the user is not connected to a service providing playback of the upcoming live media program, wherein the upcoming live media program is one of a plurality of live media programs in which the service provides playback across a plurality of channels;
    responsive to determining that the client device of the user is not connected to the service providing playback of the upcoming live media program, determining that the upcoming live media program is not currently scheduled to be recorded for the user; and
    responsive to determining that the upcoming live media program is not currently scheduled to be recorded for the user, causing the notification to be transmitted to the user, wherein the notification indicates that the upcoming live media program is about to start.

2. The method of claim 1, wherein the notification to be transmitted to the user includes an option for the user to initiate a recording of the upcoming live media program which, when selected, causes the upcoming live media program to be recorded for the user.

3. The method of claim 1, further comprising:
    determining that a personal client device of the user is located in proximity to the client device that is capable of playing the upcoming live media program; and
    wherein the notification to be transmitted to the user includes transmitting a notification to the personal client device of the user that includes an option for the user to cast the upcoming live media program to the client device that is located in proximity to the user.

4. The method of claim 1, further comprising:
    automatically causing the upcoming live media program to be recorded for the user responsive to determining that the upcoming live media program is not currently scheduled to be recorded for the user.

5. The method of claim 1, wherein the upcoming live media program has been automatically determined to be of interest to the user based on media consumption data of the user.

6. The method of claim 1, wherein determining that the client device of the user is not connected to the service providing playback of the upcoming live media program includes determining that an active web socket connection does not exist between the client device of the user and the service providing playback of the upcoming live media program.

7. A server for providing a notification of an upcoming live media program to a user, comprising:
    a non-transitory computer-readable storage medium to store code; and
    a set of one or more processors coupled with the non-transitory computer-readable storage medium, operative to execute the code, to:
        determine that the upcoming live media program is scheduled to start within a predefined amount of time that serves as an indication that the upcoming live media program is about to start, wherein the upcoming live media program has been automatically determined to be of interest to the user;
        responsive to a determination that the upcoming live media program is scheduled to start within the predefined amount of time, determine that a client device of the user is not connected to a service providing playback of the upcoming live media program, wherein the upcoming live media program is one of a plurality of live media programs in which the service is capable of providing playback across a plurality of channels;
        responsive to a determination that the client device of the user is not connected to the service providing playback of the upcoming live media program, determine that the upcoming live media program is not currently scheduled to be recorded for the user; and
        responsive to a determination that the upcoming live media program is not currently scheduled to be recorded for the user, cause the notification to be transmitted to the user, wherein the notification indicates that the upcoming live media program is about to start.

8. The server of claim 7, wherein the notification to be transmitted to the user is to include an option for the user to initiate a recording of the upcoming live media program which, when selected, causes the upcoming live media program to be recorded for the user.

9. The server of claim 7, wherein the server is further operative to execute code to:
    determine that a personal client device of the user is located in proximity to the client device that is capable of playing the upcoming live media program; and
    wherein the notification to be transmitted to the user is to include a transmission of a notification to the personal client device of the user that includes an option for the user to cast the upcoming live media program to the client device that is located in proximity to the user.

10. The server of claim 7, wherein the server is further operative to execute code to:
    automatically cause the upcoming live media program to be recorded for the user responsive to determining that the upcoming live media program is not currently scheduled to be recorded for the user.

11. The server of claim 7, wherein the upcoming live media program has been automatically determined to be of interest to the user based on media consumption data of the user.

12. The server of claim 7, wherein the determination that the client device of the user is not connected to the service providing playback of the upcoming live media program includes a determination that an active web socket connection does not exist between the client device of the user and the service providing playback of the upcoming live media program.

13. A non-transitory computer-readable storage medium having computer code stored therein, which when executed by a processor, causes the processor to perform operations for providing a notification of an upcoming live media program to a user, comprising:
- determining that the upcoming live media program is scheduled to start within a predefined amount of time that serves as an indication that the upcoming live media program is about to start, wherein the upcoming live media program has been automatically determined to be of interest to the user;
- responsive to determining that the upcoming live media program is scheduled to start within the predefined amount of time, determining that a client device of the user is not connected to a service providing playback of the upcoming live media program, wherein the upcoming live media program is one of a plurality of live media programs in which the service provides playback across a plurality of channels;
- responsive to determining that the client device of the user is not connected to the service providing playback of the upcoming live media program, determining that the upcoming live media program is not currently scheduled to be recorded for the user; and
- responsive to determining that the upcoming live media program is not currently scheduled to be recorded for the user, causing the notification to be transmitted to the user, wherein the notification indicates that the upcoming live media program is about to start.

14. The non-transitory computer-readable storage medium of claim 13, wherein the notification to be transmitted to the user includes an option for the user to initiate a recording of the upcoming live media program which, when selected, causes the upcoming live media program to be recorded for the user.

15. The non-transitory computer-readable storage medium of claim 13, wherein the non-transitory computer-readable storage medium further stores code that, when executed by the processor, cause the processor to perform operations including:
- determining that a personal client device of the user is located in proximity to the client device that is capable of playing the upcoming live media program; and
- wherein the notification to be transmitted to the user includes transmitting a notification to the personal client device of the user that includes an option for the user to cast the upcoming live media program to the client device that is located in proximity to the user.

16. The non-transitory computer-readable storage medium of claim 13, wherein the non-transitory computer-readable storage medium further stores code that, when executed by the processor, cause the processor to perform operations including:
- automatically causing the upcoming live media program to be recorded for the user responsive to determining that the upcoming live media program is not currently scheduled to be recorded for the user.

17. The non-transitory computer-readable storage medium of claim 13, wherein the upcoming live media program has been automatically determined to be of interest to the user based on media consumption data of the user.

18. The non-transitory computer-readable storage medium of claim 13, wherein determining that the client device of the user is not connected to the service providing playback of the upcoming live media program includes determining that an active web socket connection does not exist between the client device of the user and the service providing playback of the upcoming live media program.

* * * * *